United States Patent
Nozaki (10) Patent No.: US 9,122,060 B2
(45) Date of Patent: Sep. 1, 2015

(54) SCANNING IMAGE PROJECTOR AND METHOD OF DRIVING SCANNING IMAGE PROJECTOR

(71) Applicant: CITIZEN HOLDINGS CO., LTD., Tokyo (JP)

(72) Inventor: Takaaki Nozaki, Tokyo (JP)

(73) Assignee: CITIZEN HOLDINGS CO., LTD., Tokyo (JP)

(*) Notice: Subject to any disclaimer, the term of this patent is extended or adjusted under 35 U.S.C. 154(b) by 184 days.

(21) Appl. No.: 13/803,926

(22) Filed: Mar. 14, 2013

(65) Prior Publication Data
US 2013/0250388 A1 Sep. 26, 2013

(30) Foreign Application Priority Data

Mar. 26, 2012 (JP) ................... 2012-069460

(51) Int. Cl.
*G02B 26/10* (2006.01)
*H04N 9/31* (2006.01)

(52) U.S. Cl.
CPC ............ *G02B 26/101* (2013.01); *H04N 9/3129* (2013.01)

(58) Field of Classification Search
CPC ..... G02B 26/101; G02B 26/10; H04N 9/3129
USPC ....................... 359/201.1–202.1, 214.1–215.1
See application file for complete search history.

(56) References Cited

U.S. PATENT DOCUMENTS

| 2004/0223126 A1* | 11/2004 | Hatakeyama et al. ........ 353/122 |
| 2008/0266627 A1* | 10/2008 | Brown et al. ................. 359/198 |
| 2010/0079683 A1* | 4/2010 | Kobori et al. ................. 348/744 |

FOREIGN PATENT DOCUMENTS

| JP | H07-199146 A | 8/1995 |
| JP | 2004-252012 A | 9/2004 |
| JP | 2011-215398 A | 10/2011 |

OTHER PUBLICATIONS

Kaisetsu Laser Display, The Optronics, Co., Ltd., Feb. 18, 2010, p. 217, Fig. 1.

* cited by examiner

*Primary Examiner* — James Phan (57) ABSTRACT

A scanning image projector includes a laser light source, an MEMS scanner having a reflecting mirror which vibrates around first and second axes that are orthogonal to each other, and an MEMS control unit having a high speed drive circuit which causes resonant vibration of the reflecting mirror at high speed around the first axis, a low speed drive circuit which causes non-resonant vibration of the reflecting mirror at low speed around the second axis, and an offset drive circuit which offsets a position on the second axis in a non-resonant vibration region where the low-speed vibration is caused by a predetermined amount, wherein the MEMS control unit displays an image in a predetermined display region by drive signals from the high and the low speed drive circuits, and moves a position of the display region in the non-resonant vibration region by an offset signal from the offset drive circuit.

4 Claims, 8 Drawing Sheets

SCANNING IMAGE PROJECTOR AND METHOD OF DRIVING SCANNING IMAGE PROJECTOR

RELATED APPLICATIONS

This application is a new U.S. patent application that claims benefit of JP2012-0069460, filed on Mar. 26, 2012, the entire content of JP2012-069460 is hereby incorporated by reference.

TECHNICAL FIELD

The present invention relates to a scanning image projector using an MEMS scanner and a method of driving the scanning image projector. More particularly, the present invention relates to a scanning image projector that makes it possible to move and change the position of a display region where an image is displayed.

BACKGROUND

Conventionally, with scanning image projectors, studies have been made to change the position of a display region to be displayed on a screen and/or the like, and to display projected images in varying positions. Objects of this include, for example, changing the projecting position of a keyboard such as a projection keyboard depending on need so as to allow a plurality of operators to use one keyboard on a shared basis, and moving and displaying menu images on a restaurant table so as to remove a menu of a plurality of sheets.

Various proposals have been made for these methods of displaying projected images in varying positions, and, for example, patent document 1 describes a configuration to provide a rotating optical member which mounts an optical scanning means that displays an image, and change the position of a projected image by rotating the whole of the rotating optical member. Furthermore, patent document 2 describes a configuration to provide a servo motor for rotation control in a reflecting mirror for projection, and change the position of a projected image on a screen by changing the angle of the reflecting mirror by the servo motor.

Furthermore, in recent years, instead of schemes to use a galvano mirror and a polygonal mirror as optical scanning means, optical scanning schemes to use an MEMS scanner that can be miniaturized, have been developed (see, for example, non-patent document 1, page 217, FIG. 1).

Patent Document 1: JP-2004-252012-A
Patent Document 2: JP-H07-199146-A
Non-Patent Document 1: Kaisetsu Laser Display (see page 217, FIG. 1) The Optronics, Co., Ltd., published: Feb. 8, 2010.

SUMMARY

Patent document 1 and patent document 2 describe schemes for changing the position of a display region and displaying projected images in varying positions. Such schemes might, for example, provide a rotating optical member that mounts optical scanning means and changes the display position, and such schemes might provide a servo motor for rotation control in a reflecting mirror and change the display position by changing the angle of the reflecting mirror, and so on. Consequently, a dedicated driving means such as a rotating optical member and a servo motor for rotation control need to be provided as a configuration to change the display position, which makes it inevitable to increase the size of the scanning image projector, and makes miniaturization of the scanning image projector difficult.

Furthermore, with a scanning image projector of an MEMS configuration, which is anticipated to be miniaturized, single optical scanning means is used only to constitute one display region, and, when changing the position of the display region and displaying projected images in varying positions, needs to be used in combination with a dedicated rotating mechanism as in patent document 1 and patent document 2. Therefore anticipated miniaturization of the scanning image projector is still difficult.

It is an object of the present invention to provide a scanning image projector that makes it possible to solve the above problems.

It is also an object of the present invention to provide a scanning image projector that is small, has fast response speed, and is able to change the position of a display region.

A scanning image projector includes a laser light source, an MEMS scanner having a reflecting mirror which vibrates around first and second axes that are orthogonal to each other, and an MEMS control unit having a high speed drive circuit which causes resonant vibration of the reflecting mirror at high speed around the first axis, a low speed drive circuit which causes non-resonant vibration of the reflecting mirror at low speed around the second axis, and an offset drive circuit which offsets a position on the second axis in a non-resonant vibration region where the low-speed vibration is caused by a predetermined amount, wherein the MEMS control unit displays an image in a predetermined display region by drive signals from the high speed drive circuit and the low speed drive circuit, and moves a position of the display region in the non-resonant vibration region by an offset signal from the offset drive circuit.

With the scanning image projector, the MEMS scanner preferably includes one reflecting mirror, which vibrates at high speed and vibrates at low speed around the first and second axes.

With the scanning image projector, the MEMS scanner preferably includes a first MEMS scanner having a first reflecting mirror that vibrates around the first axis, and a second MEMS scanner having a second reflecting mirror that vibrates around the second axis.

In a method of driving a scanning image projector including a laser light source, an MEMS scanner having a reflecting mirror which vibrates around first and second axes that are orthogonal to each other, and an MEMS control unit having a high speed drive circuit which causes resonant vibration of the reflecting mirror at high speed around the first axis, a low speed drive circuit which causes non-resonant vibration of the reflecting mirror at low speed around the second axis, and an offset drive circuit which offsets a position on the second axis in a non-resonant vibration region where the low-speed vibration is caused by a predetermined amount, the method includes moving a position of a display region in the non-resonant vibration region, by an offset signal from an offset drive circuit, and after having moved the display region, displaying an image in a predetermined display region by drive signals from the MEMS control unit.

The scanning image projector makes it possible to move the image display position by applying electric signals that are different from image scanning signals, to the MEMS scanner, and therefore the scanning image projector is small, has fast response speed, and is able to change the position of a display region.

BRIEF DESCRIPTION OF THE DRAWINGS

These and other features and advantages of the present invention will be better understood by reading the following description of embodiments, taken together with the drawings wherein.

DESCRIPTION OF EMBODIMENTS

Now, a scanning image projector and a method of driving the scanning image projector will be described below with reference to the accompanying drawings. Although an example of a dual-axis MEMS, which is a typical MEMS, will be described primarily, this is by no means limiting. Furthermore, it should be noted that the technical scope of this invention is not limited to the embodiments described below and covers the invention described in the appended claims and equivalents thereof.

Now, using FIG. 6 to FIG. 8, the basic configurations and operations of an MEMS scanner and a scanning image projector using the MEMS scanner will be described below.

Figure 6:
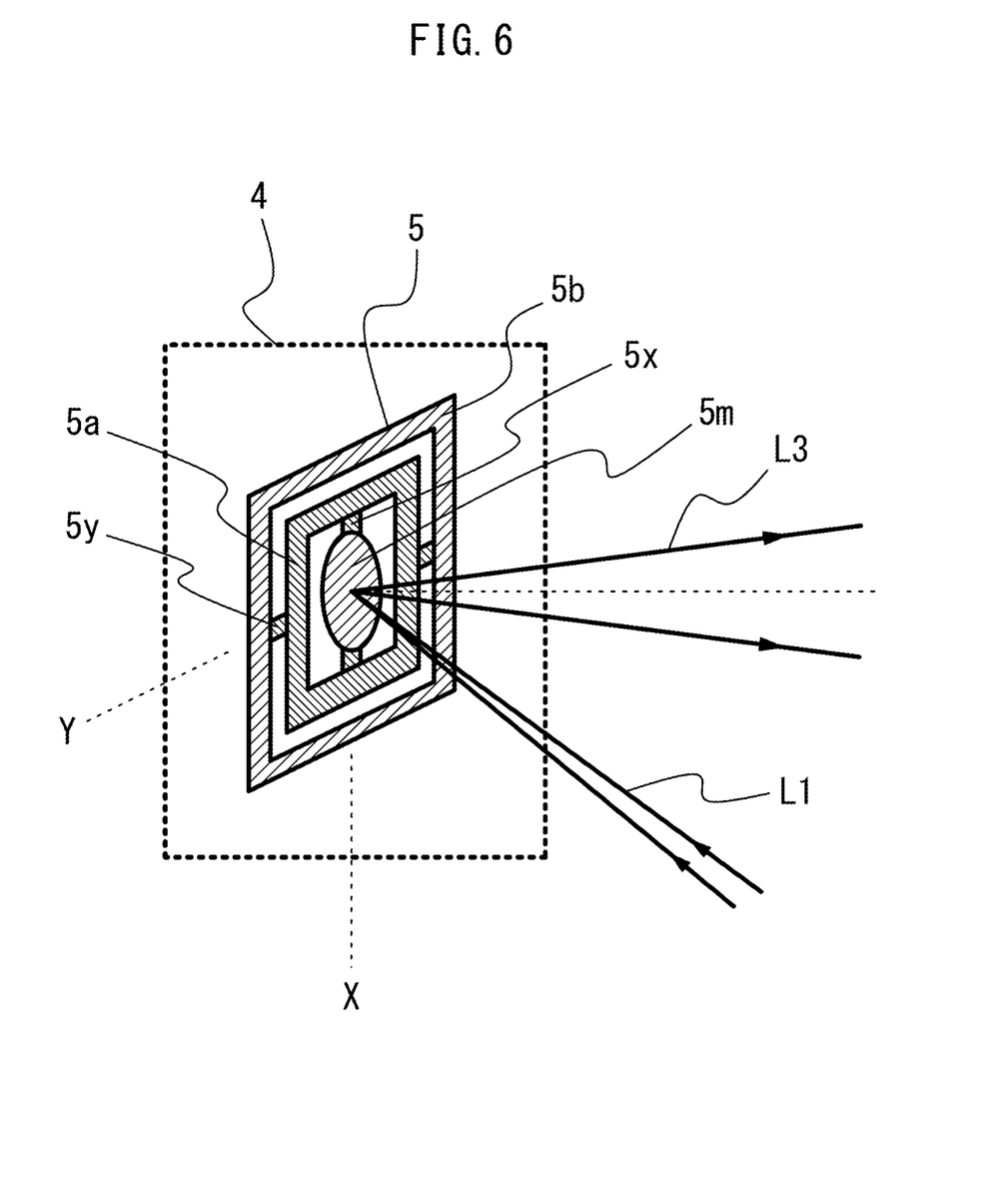
FIG. 6 is a perspective view in which an MEMS scanner 4 is schematically illustrated.

FIG. 6 is a perspective view in which an MEMS scanner 4 is illustrated schematically.

The MEMS scanner 4 includes a dual-axis MEMS 5, which includes one reflecting mirror. The dual-axis MEMS 5 has a configuration to support one reflecting mirror 5m by an X-axis member 5x, which is a first axis attached to an X-axis support frame 5a, and furthermore, to support the X-axis support frame 5a by a Y-axis member 5y, which is a second axis attached to a Y-axis support frame 5b. The reflecting mirror 5m vibrates on the X axis around the X-axis member 5x, and furthermore, the reflecting mirror 5m that is attached to the X-axis support frame 5a vibrates on the Y axis around the Y-axis member 5y, so that the reflecting mirror 5m vibrates in the XY-axis directions and projects an image in a two-dimensional display region.

Next, the operations of the dual-axis MEMS 5 will be described. As electric driving schemes for vibrating the reflecting mirror 5m, there are an electromagnetic driving scheme, an electrostatic driving scheme, a piezo driving scheme and so on. As an example of a driving scheme for generating images, the X-axis direction vibrates at high-speed, by resonant drive, at a resonant frequency that is determined by the mass of the reflecting mirror 5m and the spring constant of the X-axis member 5x. Furthermore, the Y-axis direction vibrates at low-speed, by forced drive, at a frequency that is substantially lower than the resonant frequency of the X-axis direction. Then, reflected light that is given by reflecting the incident light L1 from a laser light source (which will be described later) by the reflecting mirror 5m of the dual-axis MEMS 5 is output as exiting light L3.

Note that, for the drive frequency for high-speed vibration, a frequency of approximately 10 KHz to 20 KHz is used, and, for the drive frequency for low-speed vibration, a frequency of approximately 60 Hz is used. As the electric driving schemes of the dual-axis MEMS 5, the electromagnetic driving scheme or the piezo driving scheme is used for both high-speed vibration and low-speed vibration, and the electrostatic driving scheme is used for high-speed vibration, and also the electromagnetic driving scheme is used for low-speed vibration.

Figure 7:
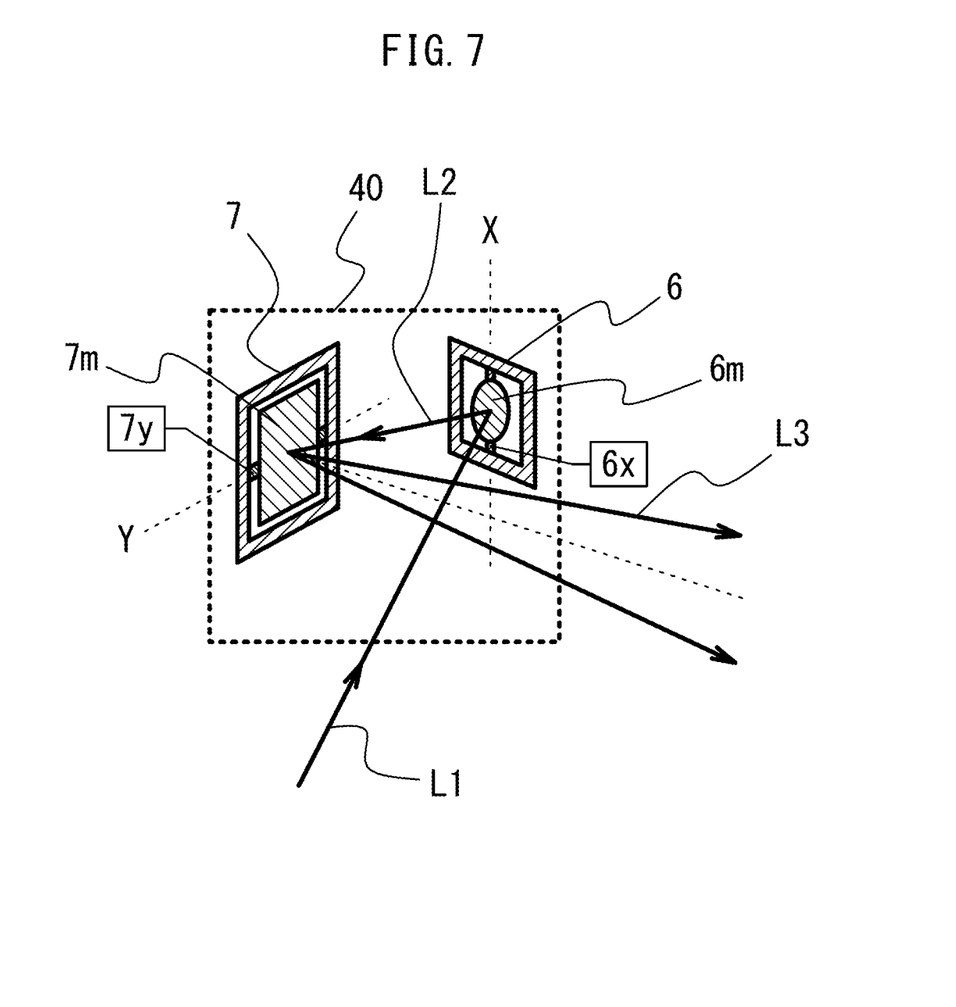
FIG. 7 is a perspective view in which an MEMS scanner 40 is schematically illustrated.

FIG. 7 is a perspective view in which another MEMS scanner 40 is illustrated schematically.

The MEMS scanner 4 illustrated in FIG. 6 is formed with two one-axis MEMSs 6 and 7, each of which includes one reflecting mirror. By contrast with this, with the MEMS scanner 40, the first one-axis MEMS 6 supports the first reflecting mirror 6m by an X-axis member 6x, which is the first axis attached to an X-axis support frame 6a. The second one-axis MEMS 7 supports a second reflecting mirror 7m by a Y-axis member 7y, which is the second axis attached to a Y-axis support frame 7a. The first and second one-axis MEMSs 6 and 7 are arranged in the state illustrated in FIG. 6, and reflect reflected light L2 that is given by reflecting the incident light L1 from the laser light source by the reflecting mirror 6m of the one-axis MEMS 6 further by the reflecting mirror 7m of the one-axis MEMS 7, and output exiting light L3. In other words, the MEMS scanner 4 illustrated in FIG. 6 and the MEMS scanner 40 illustrated in FIG. 7 are configured differently but have the same functions.

Figure 8:
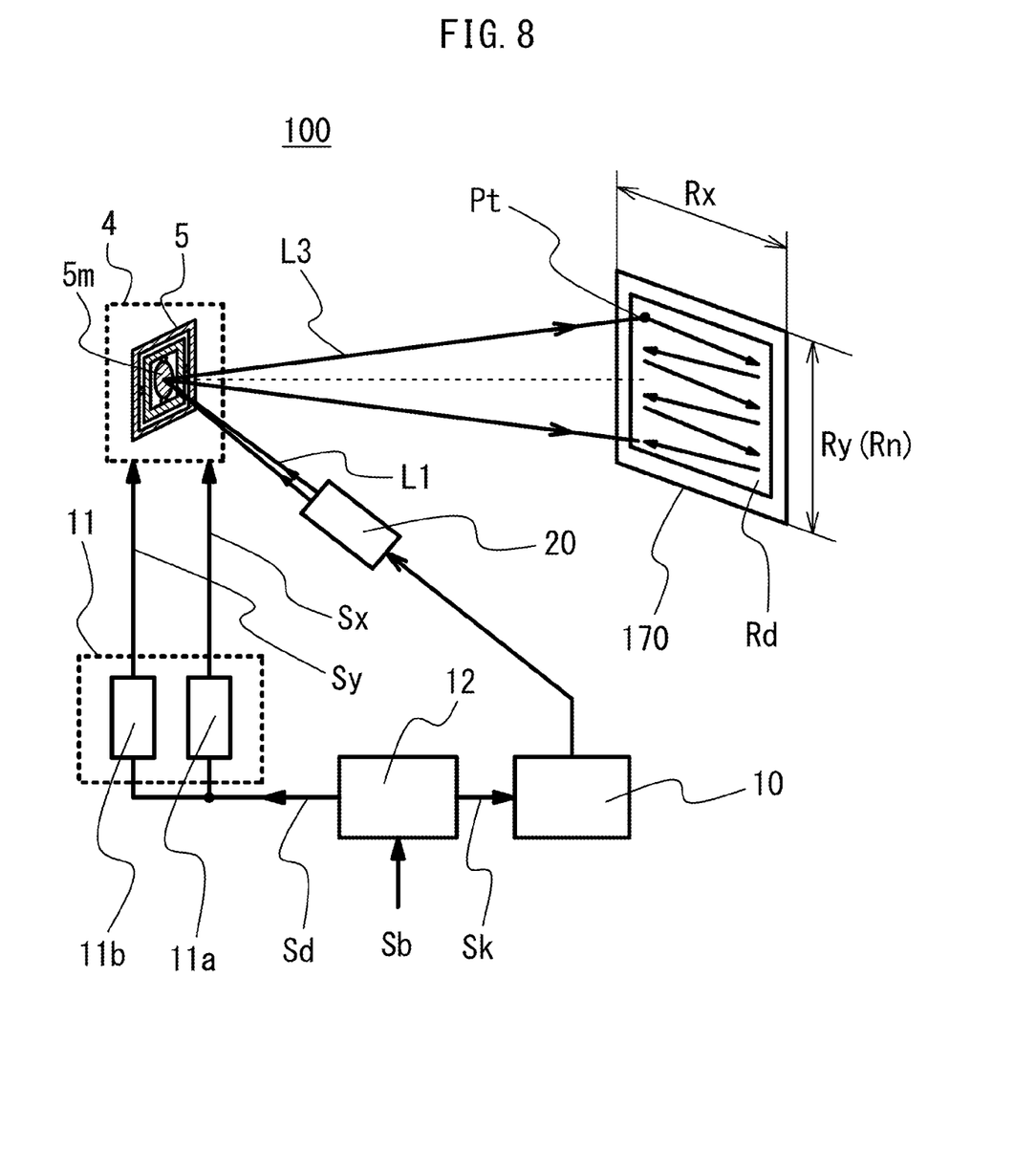
FIG. 8 is a configuration diagram of a scanning image projector 100, which uses the MEMS scanner 4 as an optical scanning means.

FIG. 8 is a configuration diagram of a scanning image projector 100, which uses the MEMS scanner 4 as an optical scanning means.

The scanning image projector 100 has the dual-axis MEMS 5 illustrated in FIG. 6 as an optical scanning means. Furthermore, the scanning image projector 100 includes a laser light source 20, which is operated by the output of a current control means 10 that is controlled by a control circuit 12 that receives a video signal Sb as input, and an MEMS control unit 11, which is controlled by the control circuit 12, and which drives the dual-axis MEMS 5 in synchronization with the output of a resonant frequency signal of the MEMS to vibrate at high speed. The MEMS control unit 11 includes a high speed drive circuit 11a, which supplies an X drive signal Sx, which is a high-speed drive signal of a resonant frequency, to the dual-axis MEMS 5, and a low speed drive circuit 11b, which supplies a Y drive signal Sy, which is a low-speed drive signal, to the dual-axis MEMS 5. Reference numeral 170 is the screen on which images are projected.

Next, the operations of the above scanning image projector 100 will be described. The control circuit 12 generates a luminance signal Sk that synchronizes with the resonant frequency signal to cause high-speed drive, in accordance with the video signal Sb that is received as input from the outside, and supplies the luminance signal Sk to the current control means 10. The current control means 10 controls the optical intensity of the laser light source 20, and the incident light L1, the optical intensity of which is controlled, is incident on the reflecting mirror 5m of the dual-axis MEMS 5. Furthermore, the control circuit 12 supplies a synchronization signal Sd, which includes a resonant frequency signal, to the MEMS control unit 11. The MEMS control unit 11 supplies an X drive signal Sx which is based on the resonant frequency signal, and a Y drive signal Sy which is synchronized with the resonant frequency signal, to the dual-axis MEMS 5. By means of the X drive signal Sx and the Y drive signal Sy, the reflecting mirror 5m of the dual-axis MEMS 5 vibrates at high speed, at 20 KHz, in the X-axis direction, and vibrates at low-speed, at 60 Hz, in the Y-axis direction, thereby optically scanning the incident light L1.

The reflecting mirror 5m of the dual-axis MEMS 5 vibrates in the X-axis direction and the Y-axis direction, so that, on the screen 170, a projecting spot Pt of the incident light L1 repeats optical scanning in the X direction and the Y direction, and a display region Rd is formed. The vertical width of the display region Rd on the screen 170 is an X-drive region Rx, and the vertical width of the display region Rd is a Y-drive region Ry. The Y-drive region Ry of the vertical direction is part of a non-resonant drive region Rn by low-speed drive.

Figure 1:
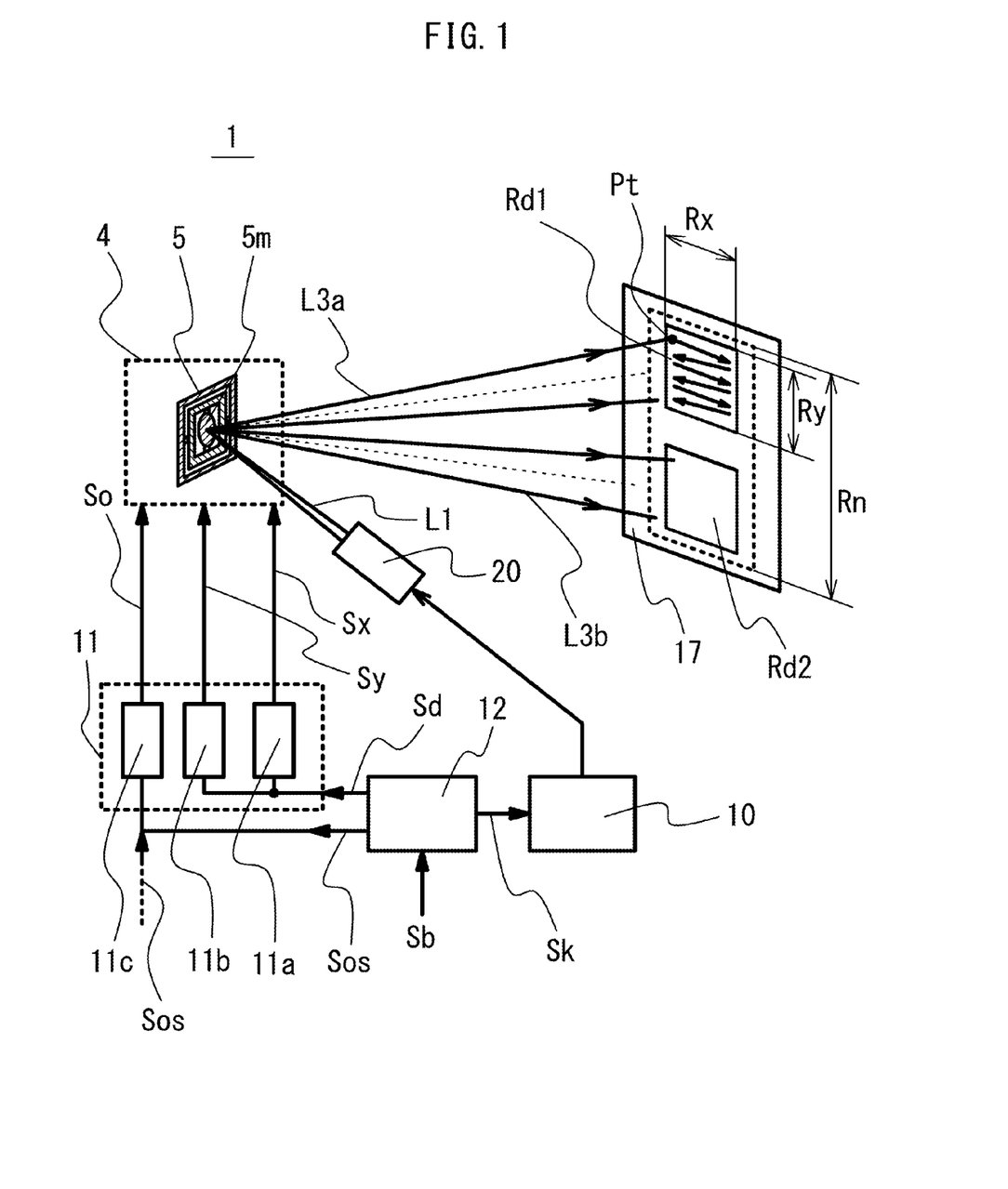
FIG. 1 is a schematic configuration diagram of a scanning image projector 1.

FIG. 1 is a schematic configuration diagram of a scanning image projector 1.

In the scanning image projector 1 illustrated in FIG. 1, the same elements as in the scanning image projector 100 illustrated in FIG. 8 will be assigned the same numbers, and overlapping descriptions will be omitted. Like the scanning image projector 100 illustrated in FIG. 8, the scanning image projector 1 has the dual-axis MEMS 5 illustrated in FIG. 6 as an optical scanning means. Furthermore, the scanning image projector 1 is configured to include a laser light source 20, which is operated by the output of the current control means 10 that is controlled by the control circuit 12 that receives the video signal Sb as input, and an MEMS control unit 11, which is controlled by the control circuit 12, and which drives the dual-axis MEMS 5 in synchronization with the resonant frequency of the MEMS to vibrate at high speed.

The MEMS control unit 11 includes a high speed drive circuit 11a, which supplies the X drive signal Sx, which is a high-speed drive signal, to the dual-axis MEMS 5, and a low speed drive circuit 11b, which supplies the Y drive signal Sy, which is a low-speed drive signal, to the dual-axis MEMS 5. Furthermore, the MEMS control unit 11 includes an offset drive circuit 11c, which supplies an offset signal So, to the dual-axis MEMS 5. The offset drive circuit 11c receives an offset command signal Sos from the control circuit 12 or the outside, and outputs the offset signal So. Note that reference numeral 17 is the screen on which images are projected.

Figure 2:
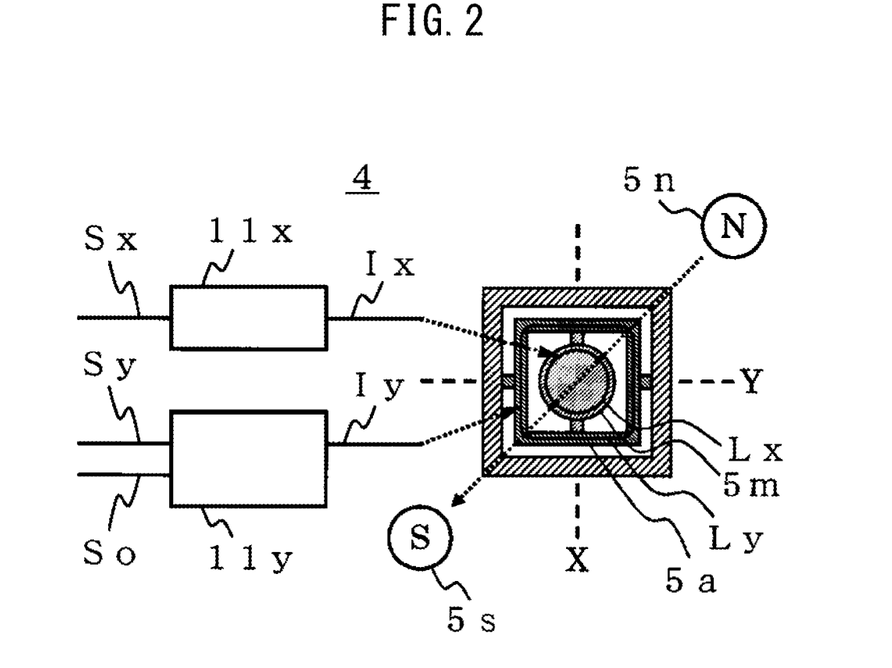
FIG. 2 is a diagram to explain a dual-axis MEMS driving scheme.

FIG. 2 is a diagram to explain a driving scheme of the dual-axis MEMS.

Here, for the driving scheme of the dual-axis MEMS 5, both the X axis (high-speed drive) and the Y axis (low-speed drive) use the electromagnetic driving scheme. To be more specific, as illustrated in FIG. 2, the X axis is driven by applying a current to an X axis coil Lx that is arranged along the periphery of the reflecting mirror 5m. Furthermore, as illustrated in FIG. 2, the Y axis is driven by applying a current to a Y axis coil Ly that is arranged along the periphery of the X-axis support frame 5a. The external magnetic field that is required to generate an electromagnetic force uses small magnets 5n and 5s, and arranges the magnets such that, in a plane including the X axis and the Y axis, the magnetic field is oriented in the direction that is 45 degrees inclined from the X axis toward the Y axis. By providing an X axis coil drive circuit 11x and applying a current Ix that is proportional to the X drive signal Sx to the X axis coil, the reflecting mirror 5m is made to resonate and drive around the X axis. Likewise, by providing a Y axis coil drive circuit 11y and applying a current Iy that is proportional to the sum of the Y axis control signal Sy and the offset signal So, the reflecting mirror 5m is made to be driven forcibly around the Y axis.

Now, the operations of the scanning image projector 1 will be described below.

The control circuit 12 supplies the video signal Sb that is received as input from the outside, and the luminance signal Sk that is synchronized with the resonant frequency signal to cause high-speed drive, to the current control means 10. The optical intensity of the laser light source 20 is controlled by the current control means 10, and the laser light from the laser light source 20 is incident on the reflecting mirror 5m of the dual-axis MEMS 5 as the incident light L1. Furthermore, the control circuit 12 supplies the synchronization signal Sd, which includes the resonant frequency signal, to the MEMS control unit 11. The MEMS control unit 11 supplies the drive signal Sx, which is based on the resonant frequency signal, and the Y drive signal Sy, which is synchronized with the resonant frequency signal, to the dual-axis MEMS 5. By this means, by making the reflecting mirror 5m of the dual-axis MEMS 5 vibrate at high speed, at 20 KHz, in the X-axis direction, and vibrate at low-speed, at 60 Hz, in the Y-axis direction, the incident light L1 is optically scanned.

The reflecting mirror 5m of the dual-axis MEMS 5 is optically scanned in the X-axis direction and the Y-axis direction, so that, on the screen 17, the projecting spot Pt of the incident light L1 repeats optical scanning in the X direction and the Y direction, and the display region Rd is formed. The area of the display region Rd1 on the screen 17 is given by the horizontal width (X-drive region Rx)×the vertical width (Y-drive region Ry), and the Y-drive region Ry of the vertical direction is the non-resonant drive region Rn which is formed under the vibration at low speed. Note that the screen size of the display region Rd1 can be formed in arbitrary size in accordance with need. For example, by changing the amplitudes of the X drive signal Sx and Y drive signal Sy, which are MEMS drive signals, it is possible to change the length of the X-drive region Rx and the length of the Y-drive region Ry and change the screen size of the display region Rd1 arbitrarily. The operations of the scanning image projector 1 up to here are tracing operations of the display region Rd1, and are the same as the operations of the scanning image projector 100.

Now, configurations and operations of the scanning image projector 1 that are different from the scanning image projector 100 will be described.

In the scanning image projector 100, as illustrated in FIG. 2, the dual-axis MEMS 5 is operated by the X drive signal Sx and the Y drive signal Sy from the MEMS control unit 11, and the image to be projected on the screen 170 is one display region Rd alone. In other words, the Y-drive region Ry and the non-resonant drive region Rn forming the display region Rd have the same length. In contrast with this, with the scanning image projector 1, the non-resonant drive region Rn, which is larger than one display region Rd, is provided on the screen 17 (the non-resonant drive region Rn is larger than the Y-drive region Ry), and, inside the large non-resonant drive region Rn, a plurality of display regions Rd1 and Rd2 (two display regions Rd1 and Rd2 in the example of FIG. 1) are formed.

This operation is carried out by supplying the offset signal So, in addition to the X drive signal Sx and the Y drive signal Sy, from the MEMS control unit 11 to the dual-axis MEMS 5. Although the reflecting mirror 5m of the dual-axis MEMS 5 forms the display region Rd by XY scanning by the X drive signal Sx and the Y drive signal Sy, exiting lights L3a and L3b of varying angles may be output by taking angle positions that are offset by the offset signal So. By this means, in the non-resonant drive region Rn on the screen 17, two display regions Rd1 and Rd2, the positions of which are moved and changed, are formed. At this time, before the offset signal So is supplied, images of the display regions Rd1 or Rd2 are displayed, looking as if the displays had moved.

Figure 3:
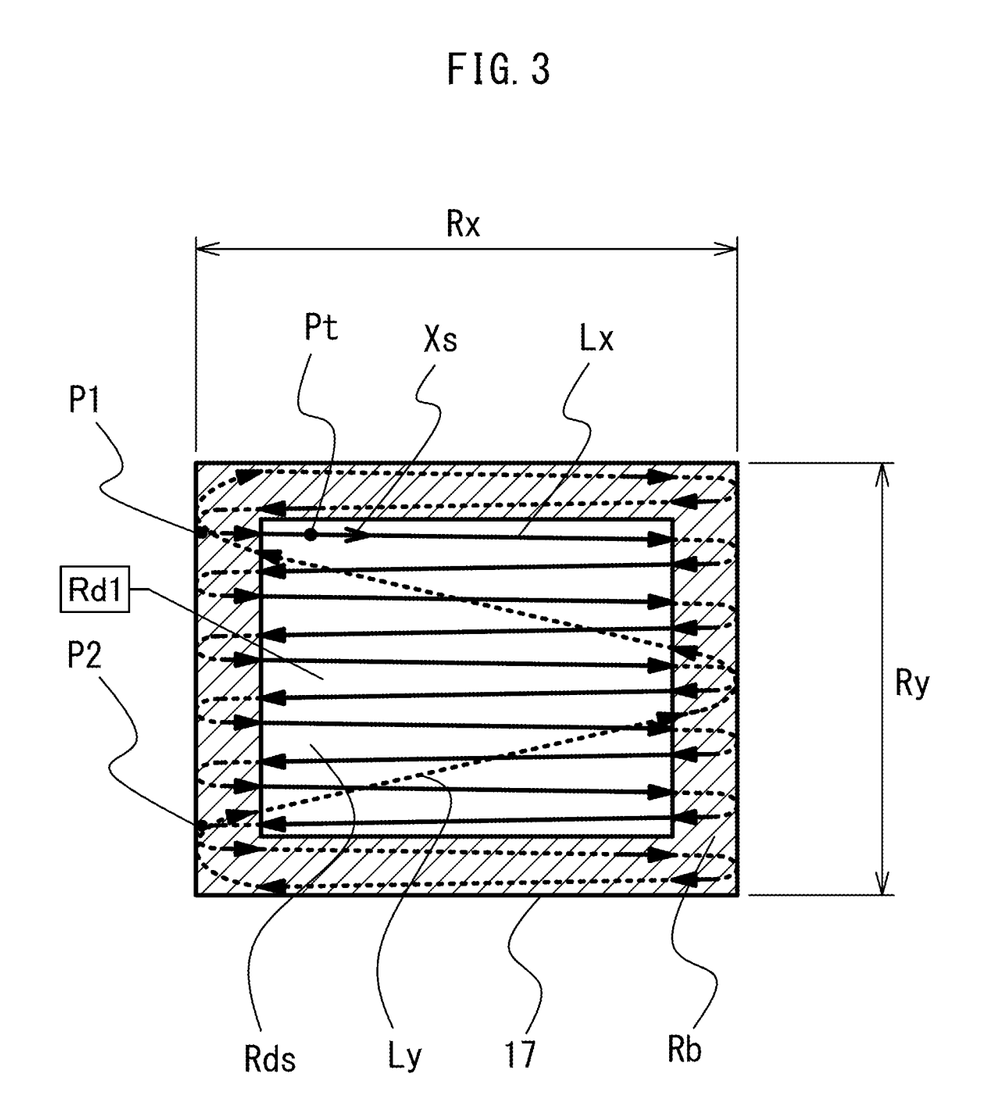
FIG. 3 is a plan view to illustrate a screenful of a display region Rd1, which is projected on a screen 17, by a dual-axis MEMS 5.

FIG. 3 is a plan view illustrating a screenful of the display region Rd1 that is projected on the screen 17 by the dual-axis MEMS 5.

As described with reference to FIG. 1, the display region Rd1 is formed by the scanning region by the X-drive region Rx that is horizontally driven and the Y-drive region Ry that is vertically driven by the dual-axis MEMS 5. To be more specific, by the vibration of the reflecting mirror 5m in the dual-axis MEMS 5, the projecting spot Pt of the laser light, which is projected on the screen 17, is moved in the arrow Xs direction and forms a path Lx. In other words, the path Lx of the projecting spot Pt moves along the arrow Xs, from the starting point of a point P1, repeating a plurality of periods of the sinusoidal wave of the X drive signal Sx, which will be described later, and finishes a screenful of drawing on the screen 17 at a point P2. After that, the path Ly returns upward, back to the starting point P1 above. By repeating the above operation, it is possible to display a continuous image. Note that the same operation is carried out with respect to the display region Rd2 as well. Note that, although the number of scanning lines is made smaller for ease of explanation in FIG. 3, the actual number of scanning lines is approximately 500 to 800.

With the actual scanning image projector, the projecting spot Pt of laser light scans in the shape of a sinusoidal wave, so that the part near the top, where the sinusoidal wave turns back, is a low-speed region including zero. Consequently, in the low-speed region, distortion is produced in the projected image. Then, in the part where distortion is produced, a scheme without projecting an image is employed. The part where distortion is produced is also referred to as a "blanking region." As for the method of forming a blanking region, there are a scheme of providing a boundary frame and a scheme of applying a mask electrically. With the scanning image projector 1, the blanking region is formed by an electrical process, and the frame-shaped region that is illustrated by hatching in FIG. 3 is the blanking region Rb. By means of the function of the blanking region Rb, for the scanning path indicated by the dotted lines in the blanking region Rb, an image is not projected by the process of stopping the incident light from the laser light source 20 and/or the like.

The display region Rd1 described with FIG. 1 is a display region for when the blanking region Rb is not provided, and the display region where the actual image is projected is a display region Rds, which is given by subtracting the blanking region Rb illustrated in FIG. 3 from the display region Rd1 in FIG. 1. Although the area of the display region Rds is smaller than the area of the display region Rd1, a projected image without image distortion is achieved. Note that, when the type of the image to be displayed is an image that is not so particular about the shape, for example, an operation button (that is, an image that poses no particular problem even if somewhat distorted), it is equally possible to make the display region Rd1 the display region on an as-is basis, without providing the blanking region Rb.

Figure 4A:
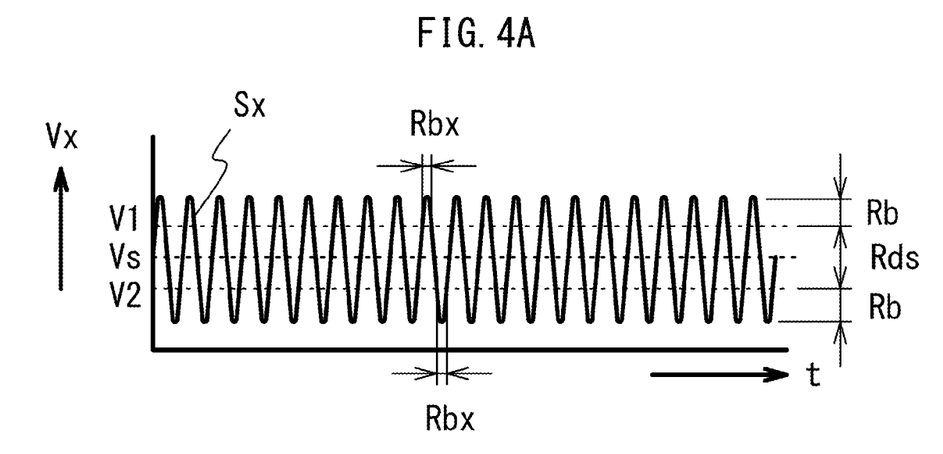
FIG. 4A is a waveform chart of a horizontal-direction drive signal (X drive signal Sx)
Figure 4B:
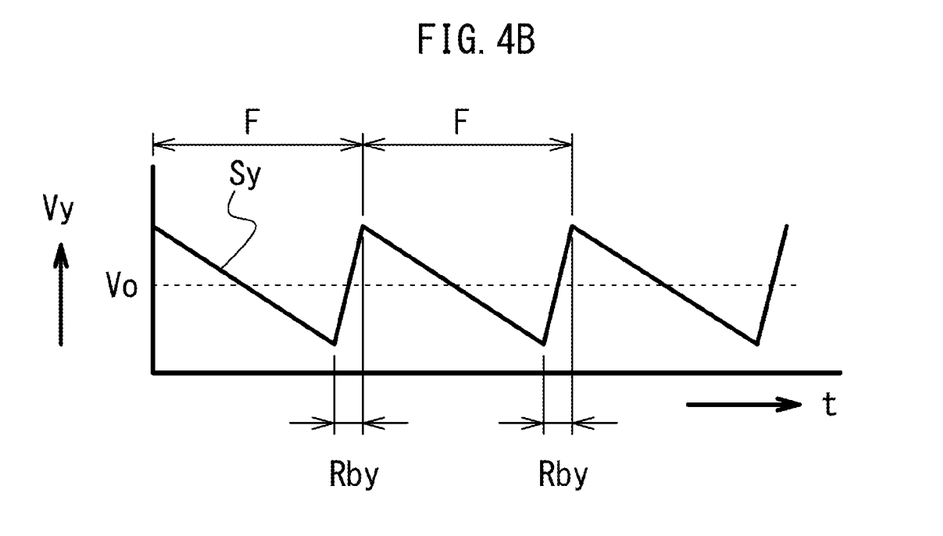
FIG. 4B is a waveform chart of a vertical-direction drive signal (Y drive signal Sy)

FIG. 4A is a waveform chart of a horizontal-direction drive signal (X drive signal Sx), and FIG. 4B is a waveform chart of a vertical-direction drive signal (Y drive signal Sy).

FIGS. 4A and 4B are drive waveform charts of a screenful of the display region Rd1 illustrated in FIG. 3. In FIG. 4A and FIG. 4B, the vertical axis is voltage and the horizontal axis is the time axis, and the waveform charts correspond to the change in time of the scanning angle, at which the reflecting mirror 5m of the dual-axis MEMS 5 is scanned, according to the X drive signal Sx and the Y drive signal Sy.

The X drive signal Sx in FIG. 4A repeats changing periodically, in the shape of a sinusoidal wave, around the amplitude center voltage Vs, and its frequency is high such as 20 KHz. Furthermore, the range of the amplitude voltages V1 and V2 around the amplitude center voltage Vs is the display region Rds, and the range beyond the amplitude voltages V1 and V2 is the blanking region Rb. In other words, the voltage waveform that is blanked on the time axis is the region of a width Rbx, which is located in the range of the blanking region Rb.

The Y drive signal Sy in FIG. 4B repeats changing periodically, in the shape of a sawtooth wave, around the amplitude center voltage Vo, and its frequency is low such as 60 Hz. Furthermore, the Y drive signal Sy forms an image by scanning for one screen, where the time width F is one period. The voltage waveform blanked on the time axis is a blanking region Rby corresponding to the returning period, in which the projecting spot Pt returns to the starting point P1 above after having finished scanning for one screen. By changing the amplitudes of the X drive signal Sx illustrated in FIG. 4A and the Y drive signal Sy illustrated in FIG. 4B, the screen size of the display region Rd1 illustrated in FIG. 1 can be changed, as described earlier.

Figure 5:
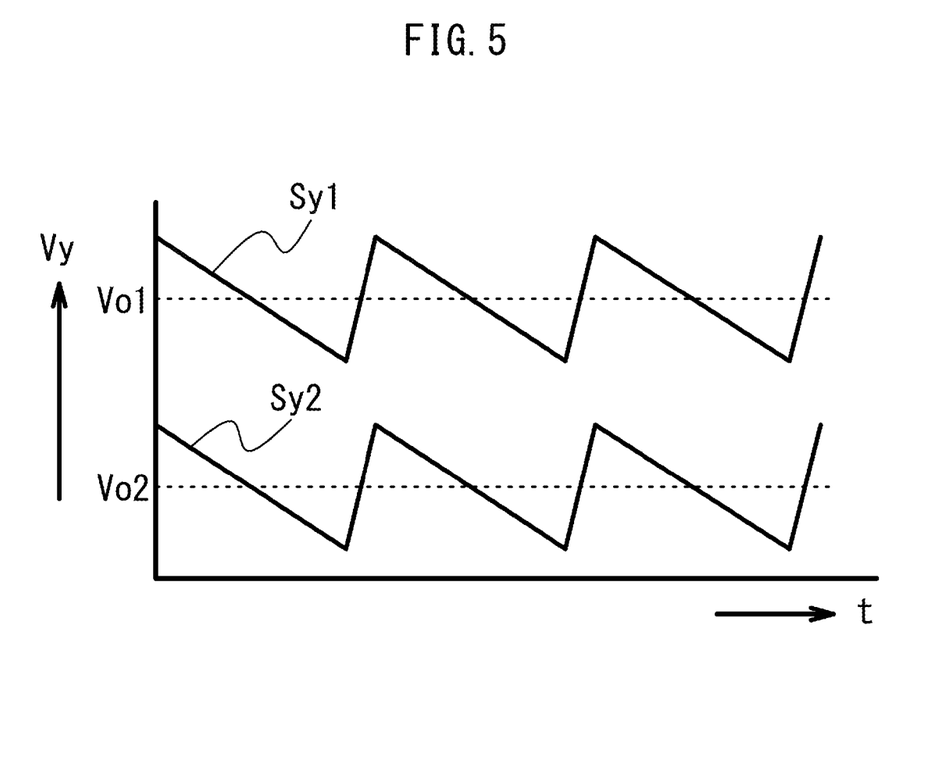
FIG. 5 is a waveform chart of a Y drive signal Sy, illustrating a state in which the operating position of the Y signal Sy illustrated in FIG. 4B is moved and changed by an offset signal So.

FIG. 5 is a waveform chart of the Y drive signal Sy, illustrating a state in which the operating position of the Y drive signal Sy illustrated in FIG. 4B is moved and changed by the offset signal So.

The waveform chart illustrated in FIG. 5 corresponds to the operation of moving and changing positions in the non-resonant drive region Rn on the screen 17 and forming two display regions Rd1 and Rd2 by supplying the offset signal So from the MEMS control unit 11 illustrated in FIG. 1. Note that two Y axis drive signals, in which the amplitude center voltage Vo is changed by the offset signal So, are illustrated side by side.

The Y drive signal Sy1 that operates by the amplitude center voltage Vo1 corresponds to the display region Rd1 on the screen 17 illustrated in FIG. 1, and the Y drive signal Sy2 that operates by the amplitude center voltage Vo2 corresponds to display region Rd2 on the screen 17 illustrated in FIG. 1. Note that the offset of the deflection angle of the MEMS scanner 4 is applied by changing the scale of the DC current component to supply to an electromagnetic drive coil. With the MEMS control unit 11 illustrated in FIG. 1, by supplying the offset command signal Sos from the control circuit 12 or the outside to the offset drive circuit 11c, the DC voltage value of the offset signal So that is supplied from the offset drive circuit 11c to the dual-axis MEMS 5, is changed from Vo1 to Vo2. By this means, the operating position of the Y drive signal Sy moves from Sy1 to Sy2, and the display region on the screen 17 is changed from Rd1 to Rd2.

The scheme to move the display regions Rd1 and Rd2 in vertical directions has been described above. However, this is by no means limiting. For example, with the scanning image projector 1 illustrated in FIG. 1, it is possible to move the display regions Rd1 and Rd2 in horizontal directions, by rotating the MEMS scanner 4, which is an optical scanning means, through 90 degrees, rotating the X and Y scanning directions through 90 degrees, driving the vertical direction by an X drive signal X and driving the horizontal direction by a Y drive signal. The state of resonance cannot be achieved if an offset signal is supplied to the resonant drive in the X-axis direction, so that this is one method of coping with this.

Next, another scanning image projector 2 will be described.

The scanning image projector 1 has been described to have the dual-axis MEMS 5 included in the MEMS scanner 4 as an optical scanning means. By contrast with this, the scanning image projector 2 (not illustrated) utilizes the MEMS scanner 40, including one-axis MEMSs 6 and 7, illustrated in FIG. 7.

With the one-axis MEMS illustrated in FIG. 7, the incident light L1 from the laser light source is reflected by the reflected mirror 6m of the one-axis MEMS 6 and output as reflected light L2, and the reflected light L2 is further reflected by the reflected mirror 7m of the one-axis MEMS 7 and is output as exiting light L3. By contrast with this, with the scanning image projector 2, when the second reflecting mirror 7m is vibrated at low speed, at 60 Hz, in the Y-axis direction around the Y-axis member 7y, the offset signal So (not illustrated) is supplied in addition to the Y drive signal Sy (not illustrated in FIG. 7), so that the reflecting mirror 7m assumes an offset angle position. By this means, with the scanning image projector 2, it is possible to output the exiting light L3 at varying angles, and form two display regions, the positions of which are moved and changed, in the non-resonant drive region on the screen.

As described above, the scanning image projectors 1 and 2 scan the display regions by the X drive signal and the Y drive signal, which are AC voltages to apply to the MEMS scanner. At this time, it is equally possible to move and change the display regions on the screen by an offset signal, which is the DC voltage to apply to the MEMS scanner. Consequently, the scanning image projectors 1 and 2 are able to control the scanning of the display regions and the move and change of the display regions only by applying different, AC and DC electric signals, to the MEMS scanner.

As described above, the scanning image projectors 1 and 2 are able to move and change the display regions by only changing the voltage level to apply to the MEMS scanner in DC manner based on the offset command signal. Consequently, the scanning image projectors 1 and 2 are able to achieve miniaturization of the device, without having to use a dedicated changing mechanism, such as conventionally done, to move and change the display regions.

Note that, although a configuration to change a display region between two locations of Rd1 and Rd2 has been described above for ease of explanation, this is by no means limiting. For example, it is equally possible to form a large number of display regions by adopting multi-step switching to switch the offset signal So stepwise between a large number of operation voltages Vo1 to VoN. Furthermore, as a DC variable voltage to change the offset signal So continuously, it is possible to allow the display region to be moved continuously.

What is claimed is:

1. A scanning image projector comprising:
   a laser light source;
   an MEMS scanner having a reflecting mirror which vibrates around first and second axes that are orthogonal to each other; and
   an MEMS control unit having a high speed drive circuit which causes resonant vibration of the reflecting mirror at high speed around the first axis, a low speed drive circuit which causes non-resonant vibration of the reflecting mirror at low speed around the second axis, and an offset drive circuit which offsets a position on the second axis in a non-resonant vibration region, where the low-speed vibration is caused, by a predetermined amount,
   wherein the MEMS control unit displays an image in a predetermined display region by drive signals from the high speed drive circuit and the low speed drive circuit, and moves a position of the display region in the non-resonant vibration region by an offset signal from the offset drive circuit.

2. The scanning image projector according to claim 1, wherein the MEMS scanner includes one reflecting mirror which vibrates at high speed and vibrates at low speed, around the first and second axes.

3. The scanning image projector according to claim 1, wherein the MEMS scanner includes a first MEMS scanner having a first reflecting mirror that vibrates around the first axis, and a second MEMS scanner having a second reflecting mirror that vibrates around the second axis.

4. A method for driving a scanning image projector including a laser light source, an MEMS scanner having a reflecting mirror which vibrates around first and second axes that are orthogonal to each other, and
   an MEMS control unit having a high speed drive circuit which causes resonant vibration of the reflecting mirror at high speed around the first axis, a low speed drive circuit which causes non-resonant vibration of the reflecting mirror at low speed around the second axis, and an offset drive circuit which offsets a position on the second axis in a non-resonant vibration region where the low-speed vibration is caused by a predetermined amount, the method comprising the steps of:
   moving a position of a display region in the non-resonant vibration region by an offset signal from the offset drive circuit; and
   after having moved the display region, displaying an image in a predetermined display region by drive signals from the MEMS control unit.

\* \* \* \* \*